US006967825B2

(12) United States Patent
Gill

(10) Patent No.: US 6,967,825 B2
(45) Date of Patent: Nov. 22, 2005

(54) GMR READ SENSOR WITH AN ANTIPARALLEL (AP) COUPLED FREE LAYER STRUCTURE AND ANTIPARALLEL (AP) TAB ENDS UTILIZING A PROCESS STOP LAYER TO PROTECT THE BIAS LAYER

(75) Inventor: Hardayal Singh Gill, Palo Alto, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 139 days.

(21) Appl. No.: 10/418,884

(22) Filed: Apr. 17, 2003

(65) Prior Publication Data

US 2004/0207963 A1 Oct. 21, 2004

(51) Int. Cl.[7] .................. G11B 5/39
(52) U.S. Cl. .................. 360/324.12
(58) Field of Search .................. 360/324.12

(56) References Cited

U.S. PATENT DOCUMENTS 5,949,623 A 9/1999 Lin .................. 360/113
6,456,469 B1 * 9/2002 Gill .................. 360/324.11
6,501,627 B2 * 12/2002 Noma et al. .................. 360/324.12
2002/0024781 A1 * 2/2002 Ooshima et al. .................. 360/324.12
2002/0069511 A1 6/2002 Hasegawa et al. .................. 29/603.14
2003/0072111 A1 * 4/2003 Hasegawa et al. .................. 360/324.12
2004/0179312 A1 * 9/2004 Freitag et al. .................. 360/324.12

* cited by examiner

*Primary Examiner*—A. J. Heinz
(74) *Attorney, Agent, or Firm*—Ervin F. Johnston

(57) ABSTRACT

A GMR sensor has a head surface with an active region and first and second inactive regions along the head surface with the active region being located between the first and second inactive regions, and includes an antiparallel (AP) coupled free layer structure having an active portion and first and second inactive portions located in the active region and the first and second inactive regions respectively. The free layer structure has a free layer, an antiparallel (AP) coupling layer and a ferromagnetic bias layer wherein the AP coupling layer is located between the free layer and the bias layer wherein each of the free layer, the AP coupling layer and the bias layer has an active portion and first and second inactive portions which are located in the active region and the first and second inactive regions respectively. First and second tabs are located in the first and second inactive regions respectively with the first tab including a ferromagnetic first bias layer magnetically coupled to the first inactive portion of the bias layer and the second tab including a ferromagnetic second bias layer magnetically coupled to the second inactive portion of the bias layer.

19 Claims, 7 Drawing Sheets

(ABS)

GMR READ SENSOR WITH AN ANTIPARALLEL (AP) COUPLED FREE LAYER STRUCTURE AND ANTIPARALLEL (AP) TAB ENDS UTILIZING A PROCESS STOP LAYER TO PROTECT THE BIAS LAYER

BACKGROUND OF THE INVENTION

1. Field of the Invention

The present invention relates to a GMR read sensor with an antiparallel (AP) coupled free layer structure and antiparallel (AP) tab ends for a narrow track read head.

2. Description of the Related Art

The heart of a computer is a magnetic disk drive which includes a rotating magnetic disk, a slider that has a magnetic head assembly which includes write and read heads, a suspension arm above the rotating disk and an actuator arm. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the actuator arm swings the suspension arm to place the write and read heads over selected circular tracks on the rotating disk where signal fields are written and read by the write and read heads. The write and read heads are connected to processing circuitry that operates according to a computer program to implement the writing and reading functions.

An exemplary high performance read head employs a giant magnetoresistance (GMR) read sensor for sensing magnetic signal fields from the rotating magnetic disk. The GMR read sensor comprises a nonmagnetic electrically conductive spacer layer that is sandwiched between a ferromagnetic pinned layer and a ferromagnetic free or sense layer. An antiferromagnetic pinning layer typically interfaces the pinned layer for pinning the magnetization of the pinned layer 90° to an air bearing surface (ABS) of the read sensor wherein the ABS of the read sensor is an exposed surface of the read sensor that faces the rotating disk. First and second hard bias and lead layers are typically connected to the read sensor for conducting a sense current therethrough. The magnetization of the free layer is free to rotate upwardly and downwardly with respect to the ABS from a quiescent or zero bias point position in response to positive and negative signal fields respectively from the rotating magnetic disk. The quiescent position of the magnetization of the free layer, which is parallel to the ABS, is when the sense current is conducted through the read sensor without signal fields from the rotating magnetic disk.

When a sense current is conducted through the read sensor, electrical resistance changes of the sensor cause potential changes that are detected and processed as playback signals by processing circuitry. The sensitivity of the read sensor is quantified by a giant magnetoresistance (GMR) coefficient $\Delta R/R$ where $\Delta R$ is the change in resistance of the read sensor from minimum resistance (when magnetizations of free and pinned layers are parallel to each other) to maximum resistance (when magnetizations of the free and pinned layers are antiparallel to each other) and R is the resistance of the read sensor at minimum resistance.

First and second hard bias and lead layers are typically connected to first and second side surfaces of the read sensor, which connection is known in the art as a contiguous junction. This junction is described in commonly assigned U.S. Pat. No. 5,018,037. The first and second hard bias layers longitudinally stabilize the magnetization of the free layer of the GMR sensor in a single domain state which is important for proper operation of the GMR sensor.

Unfortunately, as the track width of the GMR sensor decreases the response of the magnetization of the free layer of the GMR sensor also decreases. This is due to the effect of the first and second hard bias layers on the GMR sensor. When the track width of the GMR sensor is sufficiently wide, such as 1.0 μm, only first and second side portions of the GMR sensor are stiffened by the first and second hard bias layers because the magnetization of the first and second hard bias layers decay into the first and second shield layers. However, when the track width of the GMR sensor is very narrow, such as 0.1 μm, the GMR sensor is stiffened in its operation from side to side so that it is less responsive to signal fields from the moving magnetic medium. There is a strong-felt need for longitudinally stabilizing the GMR sensor with first and second hard bias layers without stiffening the operation of the GMR sensor to signal fields.

SUMMARY OF THE INVENTION

An aspect of the present invention is to provide a very narrow track width GMR sensor with a longitudinally stabilized free layer which is highly responsive to signal fields from a moving magnetic medium. The GMR sensor has a head surface with an active region and first and second inactive regions along the head surface with the active region being located between the first and second inactive regions. An antiparallel (AP) coupled free layer structure has an active portion with first and second inactive portions located in the active region and the first and second inactive regions respectively. The free layer structure includes a free layer, an antiparallel (AP) coupling layer and a ferromagnetic bias layer wherein the AP coupling layer is located between the free layer and the bias layer. Each of the free layer, the AP coupling layer and the bias layer have an active portion and first and second inactive portions located in the active region in the first and second inactive regions respectively. First and second tabs are located in the first and second inactive regions respectively. The first tab has a ferromagnetic first bias layer magnetically coupled to the first inactive portion of the bias layer and the second tab has a ferromagnetic second bias layer magnetically coupled to the second inactive portion of the bias layer.

With this arrangement the active portion of the free layer is longitudinally stabilized by the inactive portion of the bias layer by an antiparallel coupling therewith and is highly sensitive to signal fields while the first and second inactive portions of the free layer are substantially nonresponsive to signal fields because of an antiparallel coupling with not only the first and second inactive portions of the bias layer respectively, but also with the first and second bias layers respectively. An aspect of the invention to accomplish these purposes is to provide the active portion of the free layer with a magnetic thickness which is greater than a magnetic thickness of the active portion of the bias layer. Another aspect to accomplish this purpose is to provide the free layer with a magnetic thickness which is equal to or less than the combined magnetic thicknesses of a bias layer portion in either of the inactive portions and either of the first and second bias layers. Other aspects of the invention provide a structure which ensures protection of the active portion of the bias layer during fabrication of the GMR sensor and providing first and second antiferromagnetic (AFM) layers exchange coupled to the first and second bias layers for pinning the magnetizations thereof.

Other aspects of the invention will be appreciated upon reading the following description taken together with the accompanying drawings wherein the various figures are not to scale with respect to one another nor with respect to the structure shown therein.

DESCRIPTION OF THE PREFERRED EMBODIMENTS

Magnetic Disk Drive

Figure 1:
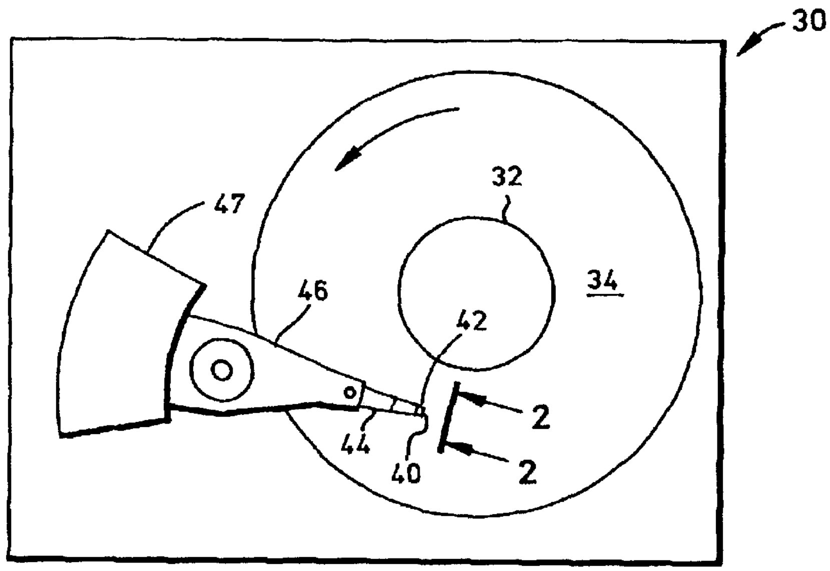
FIG. 1 is a plan view of an exemplary prior art magnetic disk drive.
Figure 2:
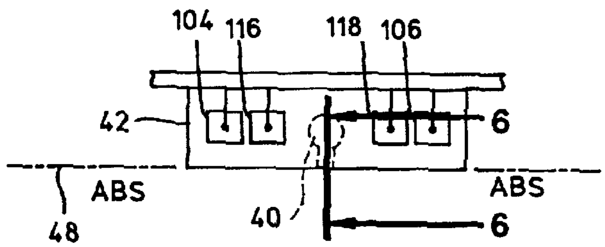
FIG. 2 is an end view of a slider with a magnetic head assembly of the disk drive as seen in plane 2—2 of FIG. 1.
Figure 3:
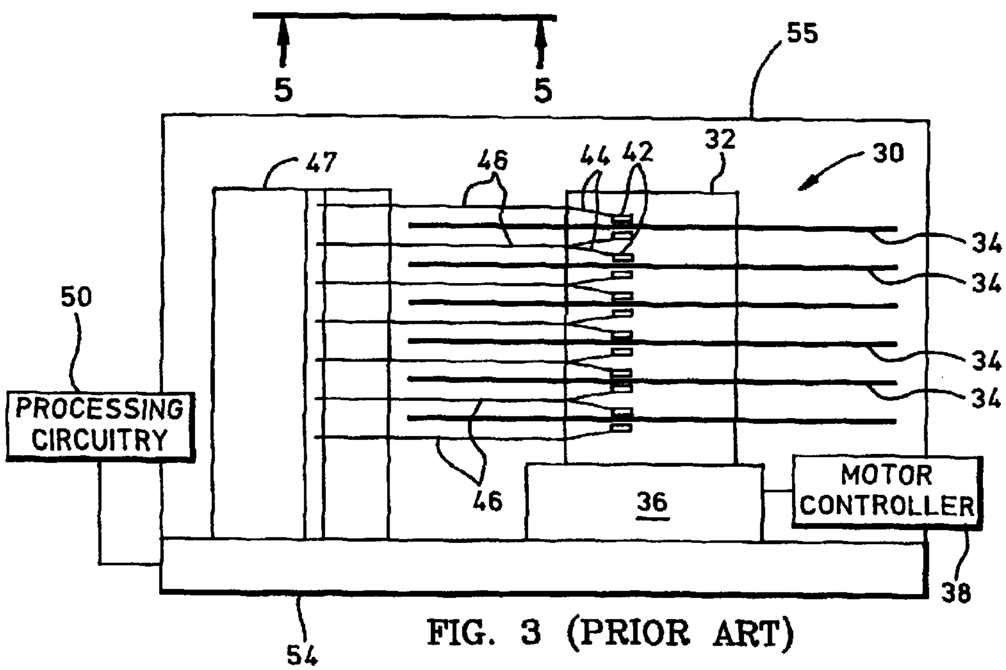
FIG. 3 is an elevation view of the magnetic disk drive wherein multiple disks and magnetic head assemblies are employed.
Figure 4:
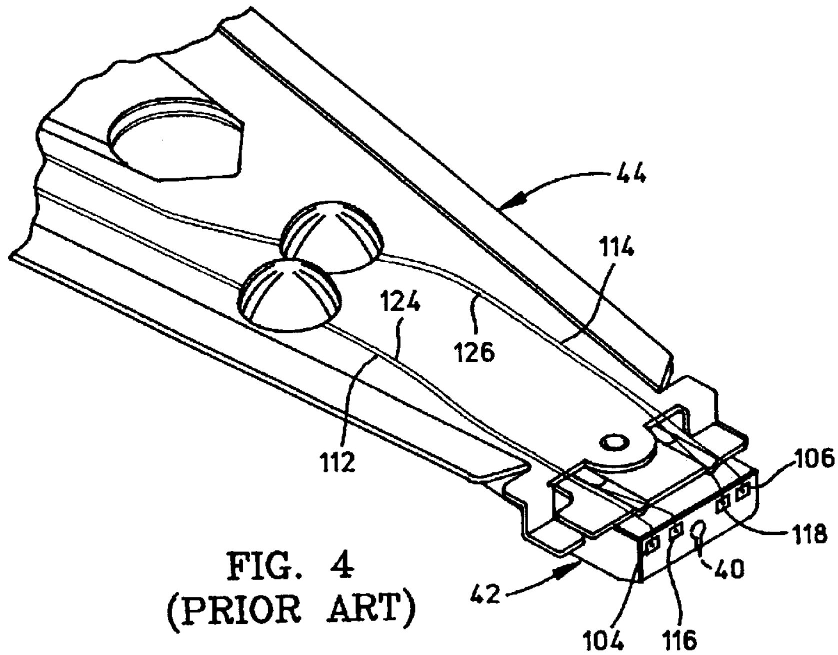
FIG. 4 is an isometric illustration of an exemplary prior art suspension system for supporting the slider and magnetic head assembly.

Referring now to the drawings wherein like reference numerals designate like or similar parts throughout the several views, FIGS. 1–3 illustrate an exemplary magnetic disk drive 30. The drive 30 includes a spindle 32 that supports and rotates a magnetic disk 34. The spindle 32 is rotated by a spindle motor 36 that is controlled by a motor controller 38. A slider 42 carries a magnetic head assembly 40 and is supported by a suspension 44 and actuator arm 46 that are rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head assembly 40 is in a transducing relationship with a surface of the magnetic disk 34. When the disk 34 is rotated by the spindle motor 36 the slider is supported on a thin (typically, 0.01 μm) cushion of air (air bearing) between the surface of the disk 34 and the air bearing surface (ABS) 48. The magnetic head assembly 40 may then be employed for writing information to multiple circular tracks on the surface of the disk 34, as well as for reading information therefrom. Processing circuitry 50 exchanges signals, representing such information, with the magnetic head assembly 40, provides spindle motor drive signals for rotating the magnetic disk 34, and provides control signals to the actuator 47 for moving the slider 42 to various tracks. In FIG. 4 the slider 42 is shown mounted to the suspension 44. The components described hereinabove may be mounted on a frame 54 within a housing 55, as shown in FIG. 3.

Figure 5:
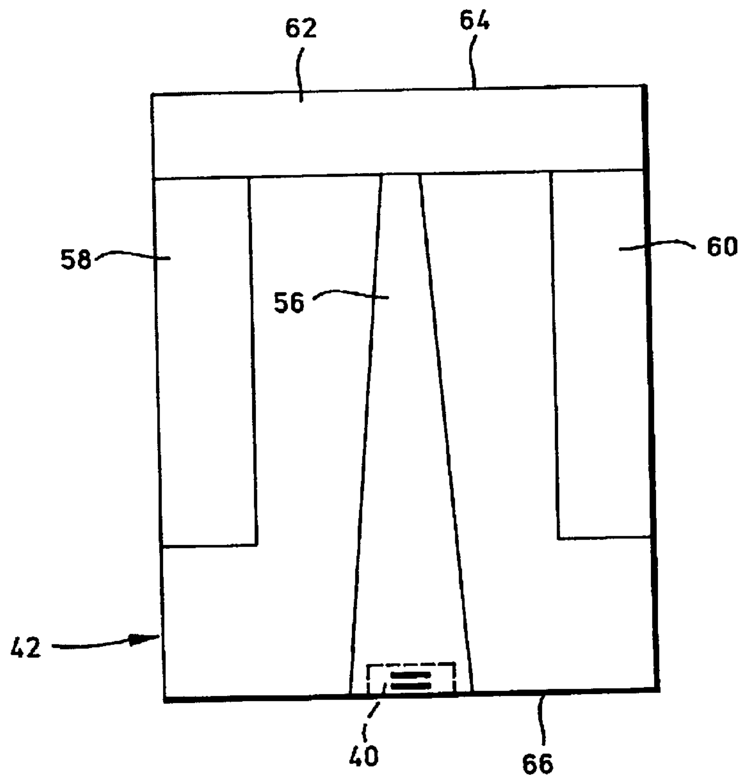
FIG. 5 is an ABS view of the magnetic head assembly taken along plane 5—5 of FIG. 2.

FIG. 5 is an exemplary ABS view of the slider 42 and the magnetic head assembly 40. The slider has a center rail 56 that supports the magnetic head assembly 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
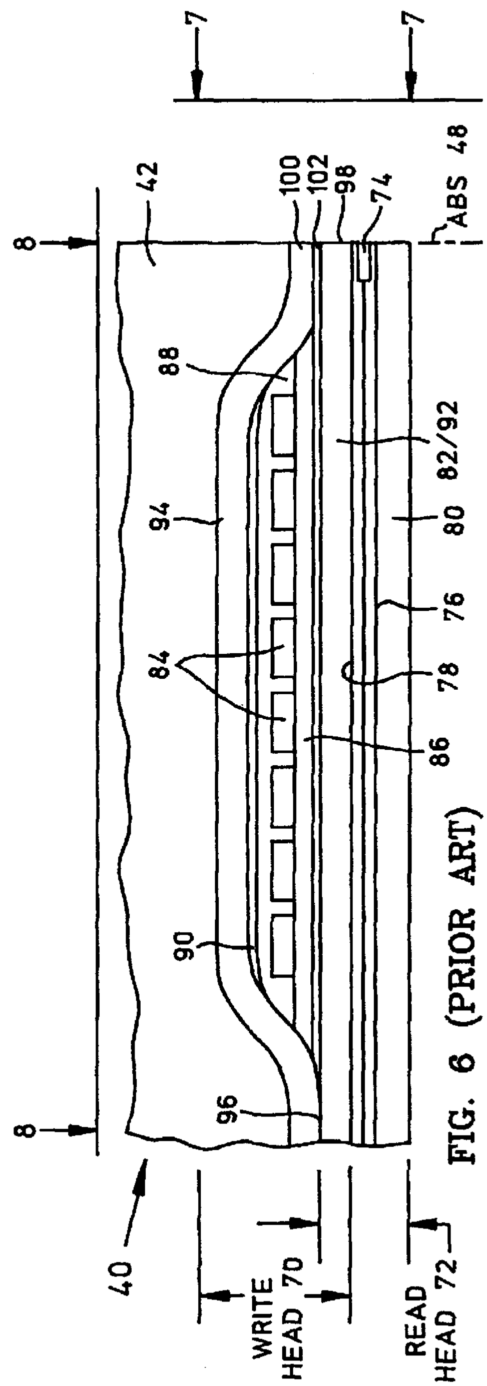
FIG. 6 is a partial view of the slider and a merged magnetic head as seen in plane 6—6 of FIG. 2.
Figure 7:
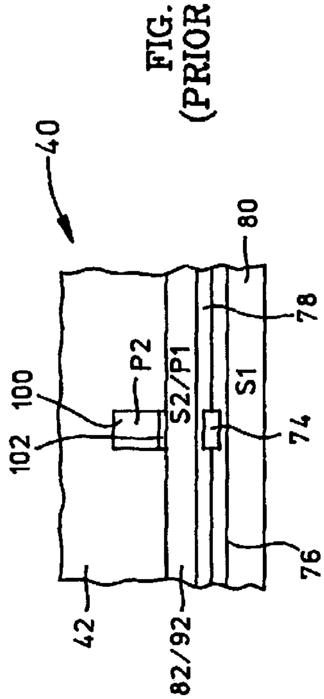
FIG. 7 is a partial ABS view of the slider taken along plane 7—7 of FIG. 6 to show the write and read heads of the magnetic head assembly.

FIG. 6 is a side cross-sectional elevation view of a merged magnetic head assembly 40, which includes a write head 70 and a read head 72, the read head employing a GMR read sensor 74. FIG. 7 is an ABS view of FIG. 6. The read sensor 74 is sandwiched between first and second nonmagnetic electrically insulative read gap layers 76 and 78 and the read gap layers are sandwiched between first and second ferromagnetic shield layers 80 and 82. In response to signal fields, the resistance of the read sensor 74 changes. A sense current Is conducted through the read sensor causes these resistance changes to be manifested as potential changes. These potential changes are then processed as readback signals by the processing circuitry 50 shown in FIG. 3.

Figure 8:
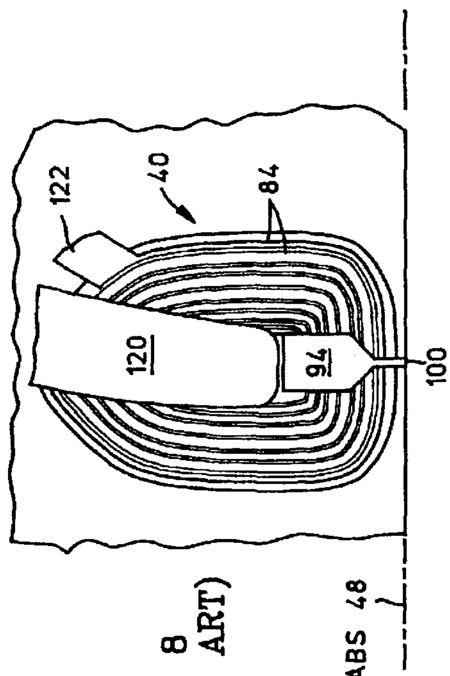
FIG. 8 is a view taken along plane 8—8 of FIG. 6 with all material above the coil layer and leads removed.

The write head 70 of the magnetic head assembly 40 includes a coil layer 84 which is sandwiched between first and second insulation layers 86 and 88. A third insulation layer 90 may be employed for planarizing the write head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second ferromagnetic pole piece layers 92 and 94. The first and second ferromagnetic pole piece layers 92 and 94 are magnetically coupled at a back gap 96 and have first and second pole tips 98 and 100 which are separated by a write gap layer 102 at the ABS. Since the second ferromagnetic shield layer 82 and the first ferromagnetic pole piece layer 92 are a common layer this head is known as a merged magnetic head assembly. In a piggyback head (not shown) the layers 82 and 92 are separate layers and are separated by an insulation layer. As shown in FIGS. 2 and 4, first and second solder connections 104 and 106 connect leads from the read sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
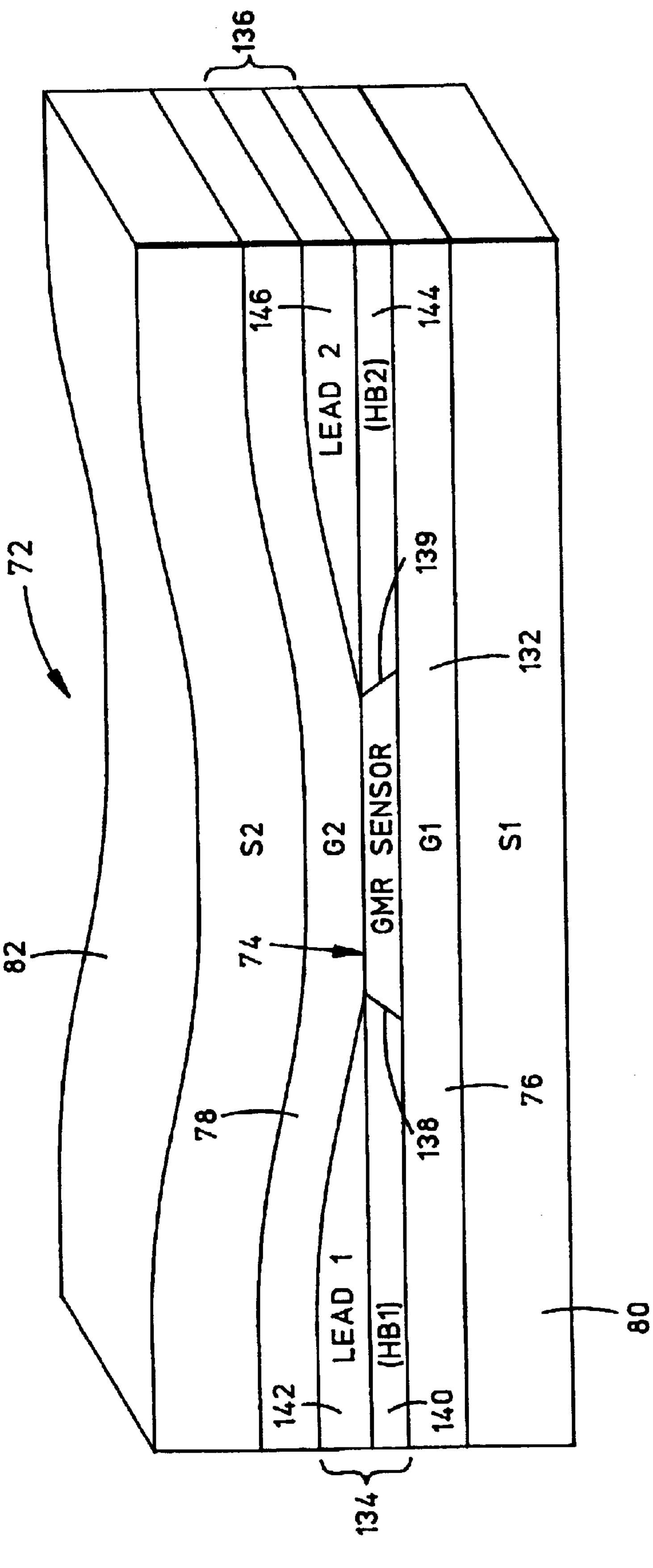
FIG. 9 is an enlarged ABS illustration of a prior art read head which has a GMR read sensor.

FIG. 9 is an enlarged ABS illustration of the read head 72 shown in FIG. 6 wherein the read head 72 includes the GMR sensor 74. First and second hard bias and lead layers 134 and 136 are typically connected to first and second side surfaces 138 and 139 of the GMR sensor 74. This connection is known in the art as a contiguous junction as referred to hereinabove. The first hard bias and lead layers 134 include a first hard bias (HB1) layer 140 and a first lead layer (Lead 1) 142. The second hard bias and lead layers 136 include a second hard bias layer (HB2) 144 and a second lead layer (Lead 2) 146. The hard bias layers 140 and 144 produce a longitudinal bias field to stabilize the free layer of the GMR sensor 74 in a single magnetic domain state. The GMR sensor 74 and the first and second hard bias and lead layers 134 and 136 are located between the nonmagnetic electrically insulating first and second read gap layers 76 and 78. The first and second read gap layers 76 and 78 are, in turn, located between the first and second ferromagnetic shield layers 80 and 82.

Present Invention

Figure 10:
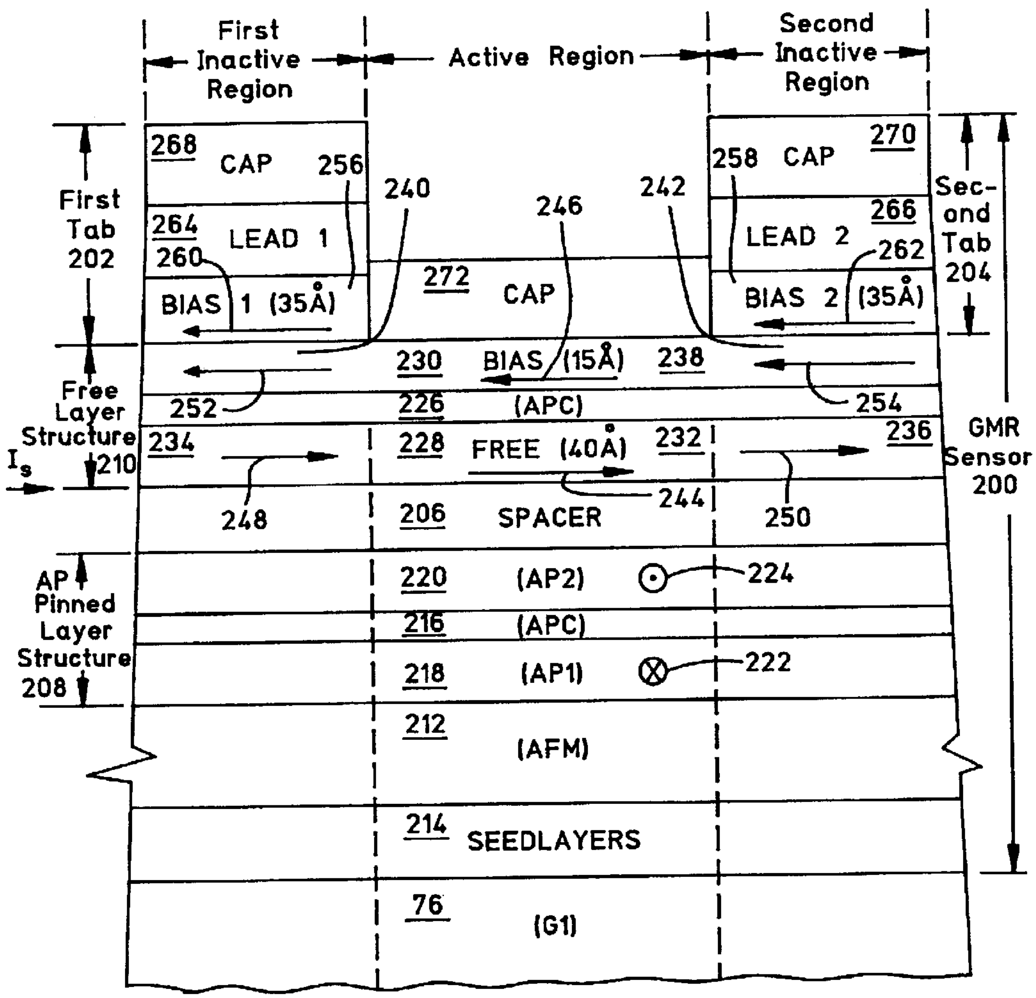
FIG. 10 is an enlarged ABS illustration of one embodiment of the present GMR sensor.

A first embodiment of the present GMR sensor 200 is illustrated in FIG. 10 and is located between first and second read gap layers 76 and 78 with only the first read gap layer (G1) 76 being shown. As shown at the top of the figure, the GMR sensor has an active region which is located between first and second inactive regions wherein the first inactive region is defined by a first tab 202 and the second inactive region is defined by a second tab 204 which will be described in more detail hereinafter.

The sensor includes a nonmagnetic electrically conductive spacer layer 206 which is located between a pinned layer structure, such as an antiparallel (AP) pinned layer structure 208, and a free layer structure 210. An antiferromagnetic pinning layer 212 may be exchange coupled to the pinned layer structure 208 for pinning a magnetic moment thereof and one or more seed layers 214 may be employed between the pinning layer and the first read gap layer 76 for promoting a desirable texture of the layers formed thereon. The AP pinned layer structure 208 may include an antiparallel coupling (APC) layer 216 which is located between first and second antiparallel pinned layers (AP1) and (AP2) 218 and 220. The pinning layer 212 pins a magnetic moment 222 of the first AP pinned layer perpendicular to the head surface in a direction out of the head or into the head as shown in FIG. 10. By a strong antiparallel coupling between the first and second AP pinned layers 218 and 220 the second AP pinned layer 220 has a magnetic moment 224 which is oriented out of the head as shown in FIG. 10.

The free layer structure 210 includes an antiparallel coupling layer (APC) 226 which is located between a ferromagnetic free layer 228 and a ferromagnetic bias layer 230. The free layer 228 has an active portion 232 which is located in the active region and first and second inactive portions 234 and 236 which are located in the first and second inactive regions respectively. The bias layer 230 has an active portion 238 which is located within the active region and first and second inactive portions 240 and 242 which are located in the first and second inactive regions respectively. The free layer 228 has a magnetization 244 which is oriented parallel to the ABS to the left or to the right as shown in FIG. 10. The active portion 238 of the bias layer has a magnetization 246 which is oriented antiparallel to the magnetization 244 of the free layer for longitudinally biasing and magnetically stabilizing the free layer by an antiparallel coupling via the APC layer 226. The magnetic strength of the active portion 238 of the bias layer implements the desired longitudinal stabilization of the active portion 232 of the free layer without stiffening the operation of the active portion 232 of the free layer so that its response to signal fields is acceptable.

The magnetization 244 of the active portion 232 of the free layer responds to the signal fields by rotating into the sensor or out of the sensor, depending upon whether the signal fields is a plus signal or a minus signal respectively. When a signal field rotates the magnetization 244 into the head the magnetizations 244 and 224 become more antiparallel which increases the resistance of the sensor to a sense current Is and when a signal field rotates the magnetization 244 out of the sensor the magnetizations 244 and 224 become more parallel which decreases the resistance of the sensor to the sense current $I_S$. These resistance changes cause potential changes in the sense current circuit which are processed as playback signals by the processing circuitry 50 in FIG. 3.

A first inactive portion 234 of the free layer has a magnetization 248 which is oriented from left to right in the same manner as magnetization 244 and the second inactive portion of the free layer has a magnetization 250 which is likewise oriented from left to right. It is important that the magnetizations 248 and 250 substantially not respond to any signal fields. Any response thereby will result in side reading which seriously degrades the performance of the GMR sensor. The magnetizations 248 and 250 are stiffened in their positions shown in FIG. 10 so as to be nonresponsive to signal fields by the first and second inactive portions 240 and 242 of the bias layer and first and second bias layers (Bias 1) and (Bias 2) 256 and 258. The first bias layer 256 is located in the first inactive region and is magnetically coupled to the first inactive portion 240 of the bias layer and the second bias layer 258 is located in the second inactive region and is magnetically coupled to the second inactive portion 242 of the bias layer. The first bias layer 256 has a magnetization 260 which is parallel to the magnetization 252 and the second bias layer 258 has a magnetization 262 which is parallel to the magnetization 254. The magnetizations 252 and 260 are antiparallel coupled to the magnetization 248 of the inactive portion of the free layer for maintaining the orientation of the magnetization 248 parallel to the ABS from left to right as shown in FIG. 10. It can be visualized that when a signal field tends to rotate the magnetization 248 into the head the same signal field also tends to rotate the magnetizations 252 and 260 out of the head. The magnetizations 252 and 260 are strongly antiparallel coupled to the magnetization 248 to keep the magnetization 248 substantially stationary so as to prevent or minimize side reading. The second bias layer 258 is magnetically coupled to the inactive portion 242 of the bias layer and has a magnetization 262 which is parallel to the magnetization 254. In the same manner the magnetizations 262 and 254 are strongly antiparallel coupled to the magnetization 250 for maintaining the magnetization 250 substantially stationary when subjected to a signal field.

An aspect of the invention is that the active portion 232 of the free layer has a magnetic thickness, such as 40 Å which is thicker than a magnetic thickness, such as 15 Å, of the active portion 238 of the bias layer. With this arrangement the magnetization 244 of the active portion of the free layer is stronger than the magnetization 246 of the active portion of the bias layer so that the magnetization 244 of the active portion of the free layer is responsive to signal fields from the moving magnetic medium. Another aspect of the invention is that the combined magnetic thicknesses of the inactive portion 240 of the bias layer and the first bias layer 256 is equal to or greater than the magnetic thickness of the inactive portion 234 of the free layer. In a like manner the combined magnetic thicknesses of the inactive portion 242 of the bias layer and the second bias layer 258 is equal to or greater than the magnetic thickness of the inactive portion 236 of the free layer. In the example shown in FIG. 10 the combined thicknesses are equal to 50 Å which is 10 Å greater than the magnetic thicknesses of the inactive portions 234 and 236 of the free layer.

First and second leads (Lead 1) and (Lead 2) 264 and 266 are located on the first and second bias layers 256 and 258 for conducting the sense current $I_S$ through the sensor and cap layers 268, 270 and 272 are located on the first lead layer 264, the second lead layer 266 and the active portion 238 of the bias layer for protecting the sensor from subsequent processing steps.

Exemplary materials and thicknesses of the layers are 150 Å of PtMn for the pinning layer 212, 25 Å of CoFe for the first AP pinned layer 218, 8 Å of Ru for the antiparallel coupling layer 216, 20 Å of CoFe for the second AP pinned layer 220, 25 Å of Cu for the spacer layer 206, 40 Å of NiFe for the free layer 228, 8 Å of Ru for the APC layer 226, 15 Å of NiFe for the bias layer 230, 35 Å of NiFe for each of the first and second bias layers 256 and 258 and 40 Å of Ta for the cap layers 268, 270 and 272. Various seed layers may include $Al_2O_3$, Ta, NiMn or a combination thereof.

Figure 11:
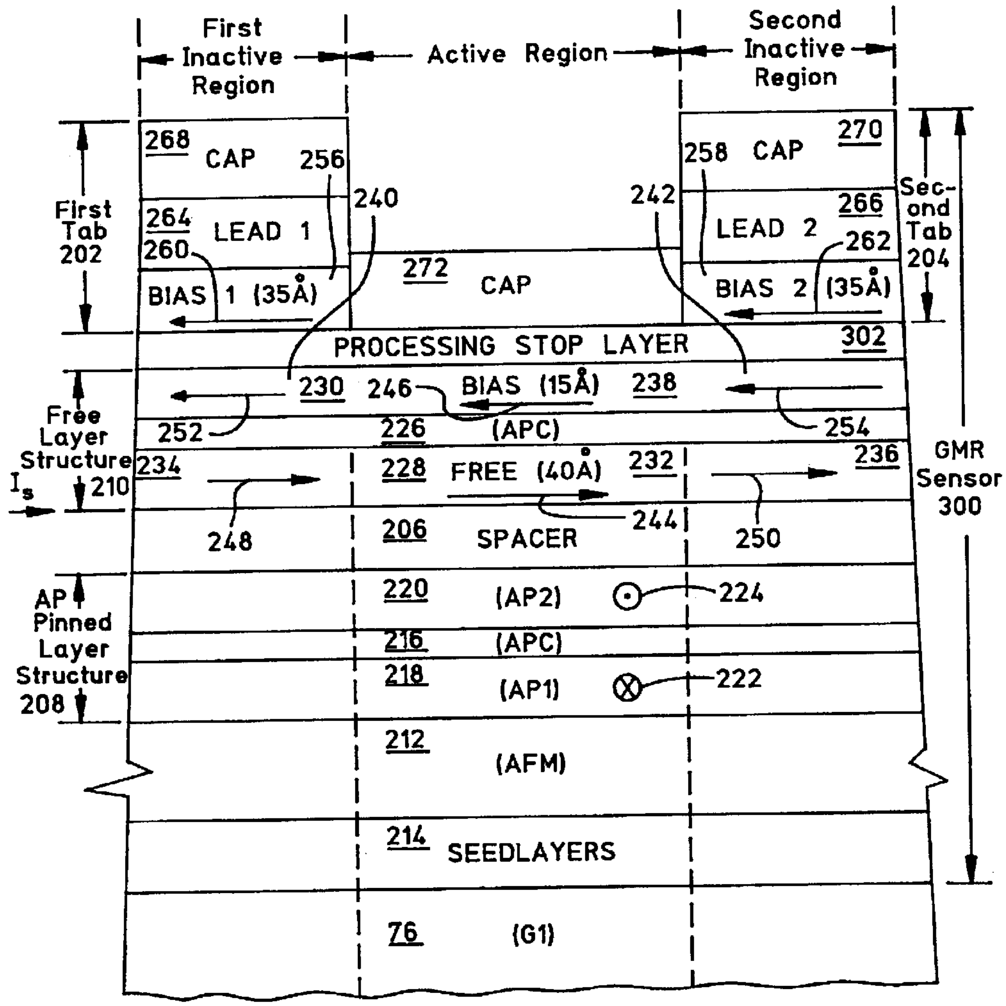
FIG. 11 is an enlarged ABS illustration of a second embodiment of the present GMR sensor.

Another embodiment of the present GMR sensor 300 is illustrated in FIG. 11. The GMR sensor 300 in FIG. 11 is the same as the GMR sensor 200 in FIG. 10 except for a processing stop layer 302. The processing stop layer is formed on top of the bias layer 238 and then a bias material layer (not shown) is formed on the processing stop layer. The first and second lead layers 264 and 266 may be formed as shown after appropriate patterning. The first and second lead layers 264 and 266 may then be employed as masks while ion milling is implemented to remove a central portion (not shown) of the bias material layer (not shown) in the active region. Once this milling mills into the processing stop layer 302 a short distance the milling can be terminated so that the milling does not mill into the active portion 238 of the bias layer. It is important that the processing stop layer be sufficiently thin so that there is magnetic coupling between the first and second bias layers 256 and 258 and the first and second inactive portions 240 and 242 of the bias layer. An exemplary material and thickness is 15 Å of copper (Cu). It is then desirable to oxidize the copper to form copper oxide (CuO) so as to enhance the aforementioned magnetic coupling.

Figure 12:
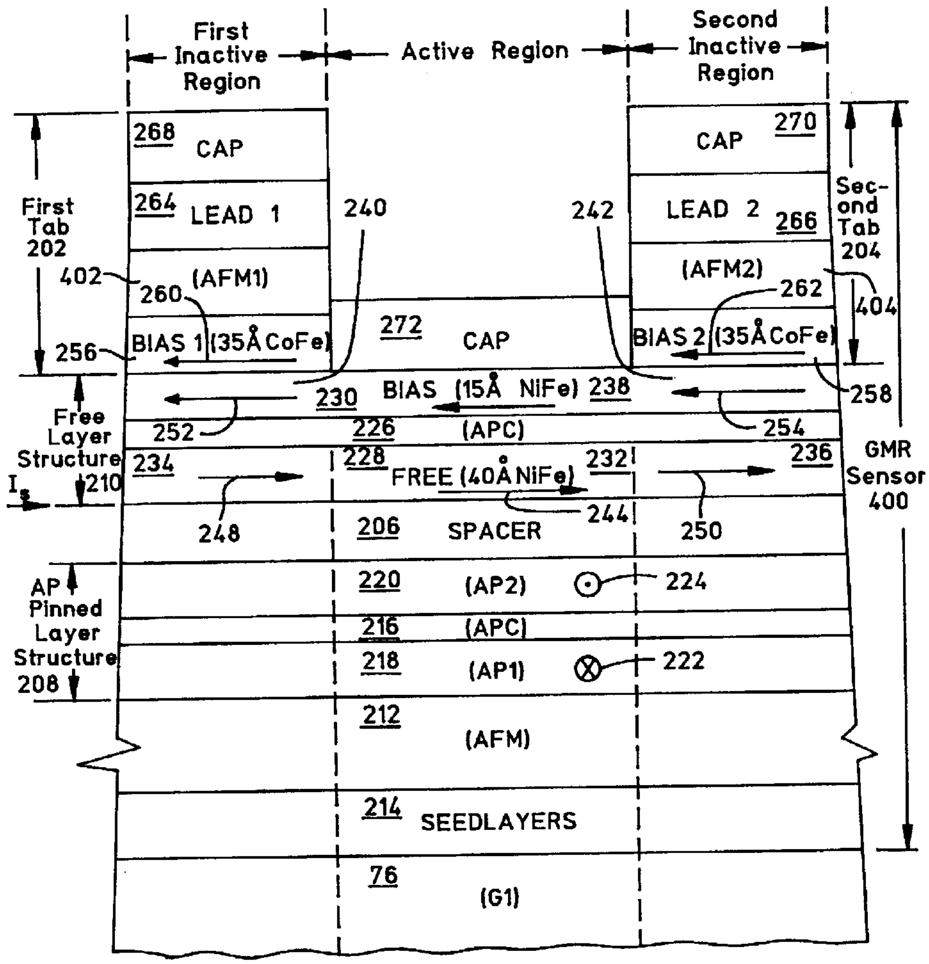
FIG. 12 is an enlarged ABS illustration of a third embodiment of the present GMR sensor.

Another embodiment of the GMR sensor 400 is illustrated in FIG. 12 which is the same as the sensor 200 illustrated in FIG. 10 except for several differences. One of the differences is that the first and second bias layers 256 and 258 are formed of a different magnetic material than the bias layer 230. An exemplary difference in materials is that the bias layer 230 is nickel iron (NiFe) and each of the first and second bias layers 256 and 258 is cobalt iron (CoFe). With this arrangement a difference in materials can be detected in the aforementioned ion milling in the active region so that the ion milling can be terminated as soon as it reaches the active portion 238 of the bias layer. Another difference in the GMR sensor 400 in FIG. 12 is that first and second antiferromagnetic pinning layers (AFM1) and (AFM2) 402 and 404 are exchange coupled to the first and second bias layers 256 and 258 respectively for pinning the orientations of the magnetizations 260 and 262 as shown. This arrangement will enhance the stiffening of the orientations of the magnetizations 248 and 250 of the first and second inactive portions of the free layer.

Discussion

It should be understood that the reference to the first and second bias layers 256 and 258 is not intended to make these layers in all embodiments separate layers with respect to the bias layer 230. Even though the first and second bias layers 256 and 258 include the term "layer" this is also intended to include an embodiment wherein the first and second bias layers 256 and 258 are not separate layers but simply homogeneous with the bias layer 238 and form pedestals thereon. The lines in the first and second inactive regions below the magnetizations 260 and 262 would be omitted in such an embodiment. In reference to FIG. 10 for the fabrication of such an embodiment a thick bias layer, such as 50 Å, can be formed after which 35 Å of the bias layer is removed in the active region by milling so as to leave a 15 Å thick active portion 238 of the bias layer.

It should further be understood that the invention may be employed with a top GMR sensor in the same manner that is employed in the bottom GMR sensors shown in FIGS. 10–12. In a top GMR sensor the first and second bias layers 256 and 258 are located at the bottom of the sensor followed by the free layer structure 210, the spacer layer 206, the pinned layer structure 208, the pinning layer 212, if any, the lead layers 264 and 266 and the cap layers 268 and 270.

It should further be understood that the AP pinned layer structure 208 may be a self-pinned AP pinned layer structure thereby eliminating the pinning layer 212. The self-pinned AP pinned layer structure is fully described in patent application Ser. No. 10/104,712. Further, the pinned layer structure 208 may be a single ferromagnetic pinned layer pinned by the pinning layer 212. The materials and thicknesses described for the various layers are exemplary and can be varied as desired. Further, the processing described hereinabove may be varied by employing other masking techniques than that described hereinabove. The GMR sensors in FIGS. 10–12 may be employed in the head 40 illustrated in FIG. 6 which may be employed in a tape or disk drive such as the disk drive illustrated in FIG. 1.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A GMR sensor having a head surface with an active region and first and second inactive regions along the head surface with the active region being located between the first and second inactive regions, comprising:

an antiparallel (AP) coupled free layer structure having an active portion and first and second inactive portions located in the active region and the first and second inactive regions respectively, the AP coupled free layer structure including:

a free layer, an antiparallel (AP) coupling layer and a ferromagnetic bias layer wherein the AP coupling layer is located between the free layer and the bias layer;

each of the free layer, the AP coupling layer and the bias layer having an active portion and first and second inactive portions which are located in the active region and the first and second inactive regions respectively; and a cap layer in the active region and located adjacent the active portion of the bias layer;

first and second tabs located in the first and second inactive regions respectively; and the first tab including a ferromagnetic first bias layer magnetically coupled to the first inactive portion of the bias layer and the second tab including a ferromagnetic second bias layer magnetically coupled to the second inactive portion of the bias layer;

a processing stop layer having an active portion and first and second inactive portions located in the active region and the first and second inactive regions respectively; and the active portion of the processing stop layer being located between the active portion of the bias layer and the cap layer, the first inactive portion of the processing stop layer being located between the first inactive portion of the bias layer and the first bias layer and the second inactive portion of the processing stop layer being located between the second inactive portion of the bias layer and the second bias layer; and the processing stop layer being sufficiently thin so that the first and second inactive portions of the bias layer are magnetically coupled to the first and second bias layers respectively.

2. A GMR sensor as claimed in claim 1 further comprising:

the active portion of the free layer having a magnetic thickness that is greater than a magnetic thickness of the active portion of the bias layer; and the first inactive portion of the bias layer and the first bias layer having a combined magnetic thickness that is equal to or greater than a magnetic thickness of the first inactive portion of the free layer and the second inactive portion of the bias layer and the second bias layer having a combined magnetic thickness that is equal to or greater than a magnetic thickness of the second inactive portion of the free layer.

3. A GMR sensor as claimed in claim 2 wherein the processing stop layer is copper oxide.

4. A GMR sensor as claimed in claim 3 wherein the processing stop layer is 15 Å thick.

5. A GMR sensor as claimed in claim 3 further comprising:

the first and second tabs further including electrically conductive first and second lead layers respectively and first and second cap layers respectively with the first lead layer being located between the first bias layer and the first cap layer and the second lead layer being located between the second bias layer and the second cap layer;

a ferromagnetic pinned layer structure; and a nonmagnetic spacer layer located between the pinned layer structure and the active portion of the free layer.

6. A GMR sensor as claimed in claim 3 further comprising:

the first and second tabs having first and second antiferromagnetic (AFM) layers respectively; and the first AFM layer being exchange coupled to first bias layer and the second AFM layer being exchange coupled to the second bias layer.

7. A GMR sensor as claimed in claim 6 further comprising:

the active portion of the free layer having a magnetic thickness that is greater than a magnetic thickness of the active portion of the bias layer; and the first inactive portion of the bias layer and the first bias layer having a combined magnetic thickness that is equal to or greater than a magnetic thickness of the first inactive portion of the free layer and the second inactive portion of the bias layer and the second bias layer having a combined magnetic thickness that is equal to or greater than a magnetic thickness of the second inactive portion of the free layer.

8. A GMR sensor as claimed in claim 7 wherein the processing stop layer is copper oxide.

9. A GMR sensor as claimed in claim 8 wherein the processing stop layer is 15 Å thick.

10. A GMR sensor as claimed in claim 8 further comprising:

the first and second tabs further including electrically conductive first and second lead layers respectively and first and second protective cap layers respectively with the first lead layer being located between the first bias layer and the first cap layer and the second lead layer being located between the second bias layer and the second cap layer;

a ferromagnetic pinned layer structure; and a nonmagnetic spacer layer located between the pinned layer structure and the active portion of the free layer.

11. A magnetic head assembly comprising:

a write head;

a read head comprising:

a GMR sensor;

nonmagnetic electrically nonconductive first and second read gap layers;

the GMR sensor being located between the first and second read gap layers;

ferromagnetic first and second shield layers; and the first and second read gap layers being located between the first and second shield layers;

the GMR sensor having a head surface with an active region and first and second inactive regions along the bead surface with the active region being located between the first and second inactive regions;

the GMR sensor including:

an antiparallel (AP) coupled free layer structure having an active portion and first and second inactive portions located in the active region and the first and second inactive regions respectively, the free layer structure including:

a free layer, an antiparallel (AP) coupling layer and a ferromagnetic bias layer wherein the AP coupling layer is located between the free layer and the bias layer; and each of the free layer, the AP coupling layer and the bias layer having an active portion and first and second inactive portions which are located in the active region and the first and second inactive regions respectively;

a ferromagnetic pinned layer structure;

a nonmagnetic spacer layer located between the pinned layer structure and the active portion of the free layer;

first and second tabs located in the first and second inactive regions respectively; and the first tab including a ferromagnetic first bias layer magnetically coupled to the first inactive portion of the bias layer and the second tab including a ferromagnetic second bias layer magnetically coupled to the second inactive portion of the bias layer;

a processing stop layer having an active portion and first and second inactive portions located in the active region and the first and second inactive regions respectively;

a cap layer in the active region;

the active portion of the processing stop layer being located between the active portion of the bias layer and the cap layer, the first inactive portion of the processing stop layer being located between the first inactive portion of the bias layer and the first bias layer and the second inactive portion of the processing stop layer being located between the second inactive portion of the bias layer and the second bias layer; and the processing stop layer being sufficiently thin so that the first and second inactive portions of the bias layer are magnetically coupled to the first and second bias layers respectively.

12. A magnetic head assembly as claimed in claim 11 further comprising:

the active portion of the free layer having a magnetic thickness that is greater than a magnetic thickness of the active portion of the bias layer; and the first inactive portion of the bias layer and the first bias layer having a combined magnetic thickness that is equal to or greater than a magnetic thickness of the first inactive portion of the free layer and the second inactive portion of the bias layer and the second bias layer having a combined magnetic thickness that is equal to or greater than a magnetic thickness of the active portion of the free layer.

13. A magnetic head assembly as claimed in claim 12 wherein the bias layer is composed of a different ferromagnetic material than each of the first and second bias layers.

14. A magnetic head assembly as claimed in claim 13 further comprising:

the first and second tabs having first and second antiferromagnetic (AFM) layers respectively; and the first AFM layer being exchange coupled to first bias layer and the second AFM layer being exchange coupled to the second bias layer.

15. A head assembly as claimed in claim 11 wherein the processing stop layer is a copper oxide layer.

16. A magnetic disk drive comprising:

at least one magnetic head assembly;

the magnetic head assembly having a write head and a read head;

the read head including:

a GMR sensor;

nonmagnetic electrically nonconductive first and second read gap layers;

the GMR sensor being located between the first and second read gap layers;

ferromagnetic first and second shield layers; and the first and second read gap layers being located between the first and second shield layers;

the GMR sensor having a head surface which has an active region and first and second inactive regions along the head surface with the active region being located between the first and second inactive regions;

the GMR sensor including:

an antiparallel (AP) coupled free layer structure having an active portion and first and second inactive portions which are located in the active region and the first and second inactive regions respectively, the free layer structure including:

a free layer, an antiparallel (AP) coupling layer and a ferromagnetic bias layer wherein the AP coupling layer is located between the free layer and the bias layer; and each of the free layer, the AP coupling layer and the bias layer having an active portion and first and second inactive portions located in the active region and the first and second inactive regions respectively;

a ferromagnetic pinned layer structure; and a nonmagnetic spacer layer located between the pinned layer structure and the active portion of the free layer;

first and second tabs located in the first and second inactive regions respectively; and the first tab including a ferromagnetic first bias layer magnetically coupled to the first inactive portion of the bias layer and the second tab including a ferromagnetic second bias layer magnetically coupled to the second inactive portion of the bias layer;

a processing stop layer having an active portion and first and second inactive portions located in the active region and the first and second inactive regions respectively;

a cap layer in the active region;

the active portion of the processing stop layer being located between the active portion of the bias layer and the cap layer, the first inactive portion of the processing stop layer being located between the first inactive portion of the bias layer and the first bias layer and the second inactive portion of the processing stop layer being located between the second inactive portion of the bias layer and the second bias layer; and the processing stop layer being sufficiently thin so that the first and second inactive portions of the bias layer are magnetically coupled to the first and second bias layers respectively;

a housing;

a magnetic medium supported in the housing;

a support mounted in the housing for supporting the magnetic head assembly with said head surface facing the magnetic medium so that the magnetic head assembly is in a transducing relationship with the magnetic medium;

a motor for moving the magnetic medium; and a processor connected to the magnetic head assembly and to the motor for exchanging signals with the magnetic head assembly and for controlling movement of the magnetic medium.

17. A magnetic disk drive as claimed in claim 16 further comprising:

the active portion of the free layer having a magnetic thickness that is greater than a magnetic thickness of the active portion of the bias layer; and the first inactive portion of the bias layer and the first bias layer having a combined magnetic thickness that is equal to or greater than a magnetic thickness of the first inactive portion of the free layer and the second inactive portion of the bias layer and the second bias layer having a combined magnetic thickness that is equal to or greater than a magnetic thickness of the active portion of the free layer.

18. A magnetic disk drive as claimed in claim 17 wherein the bias layer is composed of a different ferromagnetic material than each of the first and second bias layers.

19. A head assembly as claimed in claim 16 wherein the processing stop layer is a copper oxide layer.

* * * * *

UNITED STATES PATENT AND TRADEMARK OFFICE

CERTIFICATE OF CORRECTION

PATENT NO. : 6,967,825 B2 
DATED : November 22, 2005
INVENTOR(S) : Gill

It is certified that error appears in the above-identified patent and that said Letters Patent is hereby corrected as shown below:

<u>Column 9,</u>
Line 34, change “3” to -- 1 --.

Signed and Sealed this

Fourteenth Day of March, 2006

JON W. DUDAS
*Director of the United States Patent and Trademark Office*